United States Patent [19]  [11] 3,984,382
Parekh et al.  [45] Oct. 5, 1976

[54] NOVEL EMULSIFIABLE CATIONIC VINYL RESINS AND PROCESS FOR PREPARING THE SAME

[75] Inventors: Girish Girdhar Parekh, Stamford; Werner Josef Blank, Wilton, both of Conn.

[73] Assignee: American Cyanamid Company, Stamford, Conn.

[22] Filed: Mar. 5, 1975

[21] Appl. No.: 555,904

Related U.S. Application Data

[63] Continuation-in-part of Ser. No. 386,817, Aug. 8, 1973, abandoned, which is a continuation-in-part of Ser. No. 203,887, Dec. 1, 1971, abandoned, which is a continuation-in-part of Ser. No. 203,888, Dec. 1, 1971, abandoned, which is a continuation-in-part of Ser. No. 203,889, Dec. 1, 1971, abandoned, which is a continuation-in-part of Ser. No. 203,890, Dec. 1, 1971, abandoned.

[52] U.S. Cl. .................................. 526/15; 204/39; 428/461; 526/328; 526/11.1
[51] Int. Cl.² .......................................... C08F 8/30
[58] Field of Search ............................. 260/78.5 T

[56] References Cited
UNITED STATES PATENTS

| | | | |
|---|---|---|---|
| 3,085,986 | 4/1963 | Muskat | 260/31.8 |
| 3,415,745 | 12/1968 | Isaacson et al. | 210/54 |
| 3,532,769 | 10/1970 | Dalibor et al. | 260/855 |
| 3,585,172 | 6/1971 | Nishiyama et al. | 260/78.5 |
| 3,646,044 | 2/1972 | Sekmakas | 260/29.6 H |
| 3,652,478 | 3/1972 | Ishii et al. | 260/29.4 UA |

*Primary Examiner*—John Kight, III
*Attorney, Agent, or Firm*—James T. Dunn

[57] ABSTRACT

A modified cationic vinyl polymer prepared by the copolymerization of a polymerizable styrene, maleic anhydride and an alkyl acrylate, which polymer is then reacted with certain amino alcohols and/or certain difunctional amines containing a tertiary nitrogen atom followed by reaction with certain monoepoxy compounds. The modified vinyl polymer finds utility in electrocoating applications, particularly for anodic-soluble metals, such as copper and copper alloys wherein the vinyl polymer, in amounts varying between about 40% and 95%, by weight, is combined with about 4.0% to about 50%, by weight, of a substantially fully etherified, substantially fully methylolated aminotriazine cross-linking agent and from about 1% to about 20%, by weight, of a neutralizing agent such as a mineral acid or an organic acid in an aqueous dispersion.

10 Claims, No Drawings

NOVEL EMULSIFIABLE CATIONIC VINYL RESINS AND PROCESS FOR PREPARING THE SAME

CROSS-REFERENCES TO RELATED APPLICATIONS

This application is a continuation-in-part of our earlier application, Ser. No. 386,817, filed Aug. 8, 1973, now abandoned, which in turn is a continuation-in-part of our earlier applications, Ser. Nos. 203,887; 203,888; 203,889 and 203,890, all filed on Dec. 1, 1971 and all now abandoned.

BACKGROUND AND DESCRIPTION OF PRIOR ART

Water-dispersed polymeric coating compositions have been employed to coat metallic surfaces such as by hand, spray, electrostatic, brushing, dipping, and, more recently, by electrodeposition. These methods have gained favorable acceptance in the coating field, particularly when employing electrodeposition. Although acceptable film strength, hardness and adhesion are noted in U.S. Letters Patent No. 3,403,088 to Donald P. Hart, issued on Sept. 24, 1968, and U.S. Letters Patent No. 3,471,388 issued on Oct. 7, 1969, to J. N. Koral, a difficult problem is presented where electrocoating of anodic-soluble metals, such as copper or copper alloy substrates, is required. Such metals are adversely affected by well-known anionic resins.

SUMMARY

This invention provides an aqueous coating composition which can be used effectively to electrocoat metallic articles, particularly copper and copper alloys to attain good coating adhesion. It also provides a novel method for preparing one of the components, namely the cationic vinyl resin or polymer component substantially free from unreacted monomer. The latter cationic resin is prepared by copolymerizing, for instance, a polymerizable styrene with maleic anhydride and an alkyl acrylate, followed by reaction with an appropriate amino alcohol and/or a difunctional amine and, finally, with a monoepoxy compound, all of which are defined more fully hereinbelow.

DESCRIPTION OF THE INVENTION INCLUDING PREFERRED EMBODIMENTS

As to the polymer component of the system, there is provided a novel process for preparing a vinyl or acrylic, water-dispersible, non-gelled polymer containing at least basic tertiary nitrogen and alcoholic hydroxyl functions. In one embodiment, the polymer, substantially free from unreacted monomer, is prepared by (I) initially polymerizing in the presence of a free radical initiator a blend of (A) an alkyl acrylate, (B) maleic anhydride, and (C) a polymerizable styrene, followed by (II) the reaction of the resultant prepolymer with an appropriate amino alcohol, and, thereafter, (III) reacting the latter polymer with an appropriate monoepoxy compound, hereinafter defined.

The molar ratio of the polyermizable styrene to the maleic anhydride may be varied between about 1:1 and 1:0.05, styrene to maleic anhydride respectively, and preferably between about 1:0.7 and 1:0.1 same basis. One can prepare a styrene-maleic anhydride copolymer without any alkyl acrylate if a modified vinyl polymer was to be used as a molding composition, but when it is to be used as a coating composition where flow-out properties and flexible films are desired, some alkyl acrylate is necessary in the terpolymer. In such instances, one would use between about 40% and 80%, by weight, of the alkyl acrylate based on the total weight of all of the monomers. Preferably one would use between about 50% and 70%, by weight, of the alkyl acrylate, same basis. Correspondingly the combined amount of the polymerizable styrene and the maleic anhydride is between about 60% and 20%, by weight, same basis and preferably between about 50% and 30% same basis, wherein all percentages will total 100%.

The overall reactions may be idealistically exemplified for the sake of simplicity as follows:

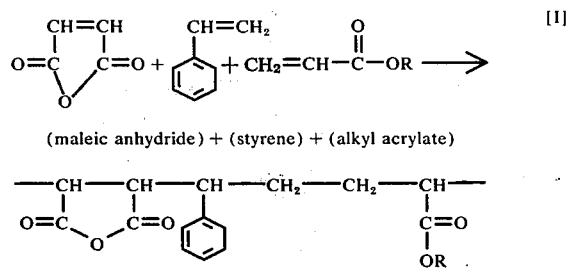

(maleic anhydride) + (styrene) + (alkyl acrylate)

Prepolymer (I)

where R is an alkyl radical having from 1 to 12 carbon atoms.

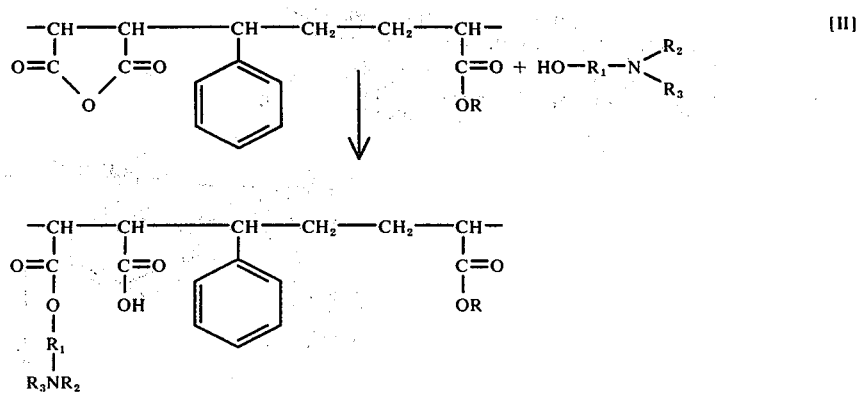

Prepolymer (II)

where
R is as defined above;
$R_1$ is alkylene having from 2 to 12 carbon atoms; and
$R_2$ and $R_3$ are each alkyl having from 1 to 4 carbon atoms.

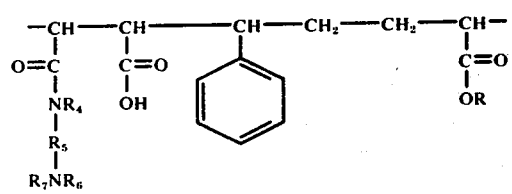

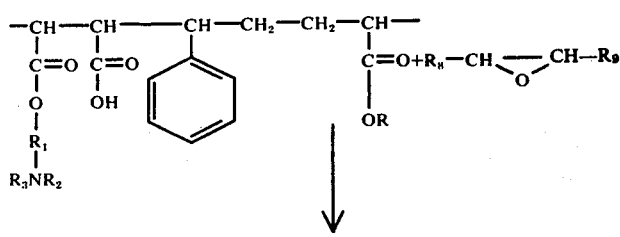

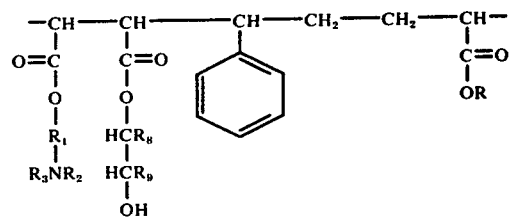

Cationic Polymer (III)

where R, $R_1$, $R_2$, and $R_3$ are as defined above; and $R_8$ and $R_9$ are each hydrogen or alkyl of from 1 to 18 carbon atoms but when $R_8$ and $R_9$ are each alkyl, they shall contain not more than a total of 18 carbon atoms.

In an alternative embodiment, the polymer, substantially free from unreacted monomer, is prepared as before followed by (II) the reaction of the resultant prepolymer with an appropriate difunctional amine and, thereafter, (III) reacting the latter polymer with an appropriate monoepoxy compound, hereinafter defined.

These alternative reactions may be idealistically exemplified for the sake of simplicity as follows:

Prepolymer (I)

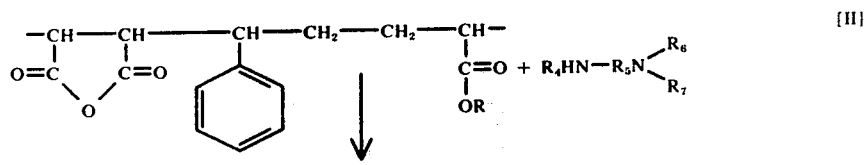

Prepolymer (II)

wherein
R is as defined before;
$R_4$ is hydrogen or an alkyl group containing 1 to 4 carbon atoms;
$R_5$ is an alkylene group containing from 2 to 12 carbon atoms; and
$R_6$ and $R_7$ are each an alkyl group containing 1 to 4 carbon atoms.

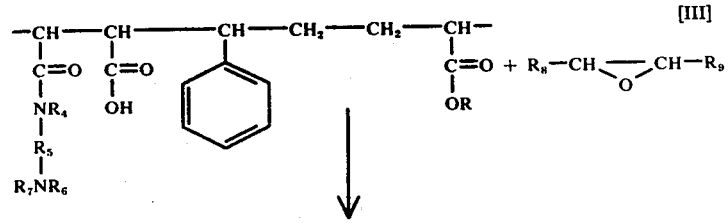

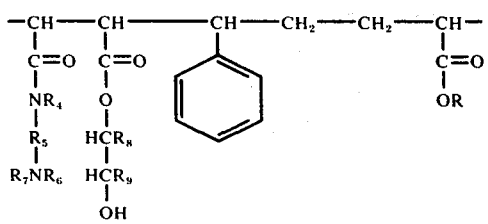

CATIONIC POLYMER (III)

where R, $R_4$, $R_5$, $R_6$, and $R_7$ are as defined above; and $R_8$ and $R_9$ are each hydrogen or alkyl radicals of from 1 to 18 carbon atoms but the total of $R_8$ and $R_9$ shall not exceed 18 carbon atoms.

The idealistic exemplifications of the overall reactions have been simplified hereinabove and the sequences of the monomer moieties may in some instances be in the order indicated but they may, and, in some instances, will be in a random order or an order different from those shown hereinabove.

It will be noted that in Step [I] above, a prepolymer or copolymer is produced which contains an anhydride moiety. In the first embodiment in Step [II], all of the latter moieties are affected by opening the hetero-O-rings in the polymer by means of an appropriate amount of a tertiary amino alcohol, i.e., equimolar amounts of an amino alcohol and anhydride moieties in the prepolymer, to provide both carboxyl and tertiary amine functions. In the first embodiment of Step [II], there is a reaction between the anhydride ring and the amino alcohol in which 1 mol of the amino alcohol is reacted with each mol of maleic anhydride moiety. In order to control the amount of the basic nitrogen groups in the polymer to the desired level, one can use a total of 1 mol of the amino alcohol per mol of the anhydride moiety. The resulting non-gelled polymer has no residual anhydride rings. At this stage the polymer has amino, carboxyl and hydroxyl pendant groups. The anhydride ring opening reaction is normally carried out between about 120° to 130°C. in a period of time varying between about ½ hour to about 2 hours. One may use a lower reaction temperature but it would cause the reaction to take place over a longer period of time in order to achieve complete reaction. Higher temperatures may be used such as 140°C., but it is not recommended due to a possibility of a gelation of the polymer if the reaction were to get out of control. The amino alcohols used in the present invention are characterized as containing tertiary nitrogen and a primary or secondary hydroxy group. Illustrative tertiary amino alcohol are:

N,N-diethylamino ethanol
N,N-dimethylamino propanol
N,N-diethylamino butanol
N,N-dipropylamino hexanol
N,N-dibutylamino octanol
N-ethoxy-N-ethylamino ethanol
N-cyclopentyl-N-ethylamino ethanol
1-piperidinyl propanol
1-imidazolyl butanol, and the like.

In the same embodiment in the Step [III], any monoepoxy compound may be used to convert the carboxyl functions of the Prepolymer (II) to hydroxyl functions. Illustrative monoepoxy compounds are:
ethylene oxide
1,2-propylene oxide
1,2-butylene oxide
1,2-pentylene oxide
3,4-hexylene oxide
1,2-octylene oxide,
and equivalents thereof.

It has been found that prior to monoepoxy reaction with the formed polymer prepared in Step [II], total conversion of the anhydride group in the prepolymer must occur, for otherwise the polymer would gel when the monoepoxy reaction takes place. A good practice is to react the polymer with the monoepoxy compound at temperatures ranging from about 0° to about 140°C.

It will be noted that in the second embodiment of the present invention, in the Step [I] above, a prepolymer or copolymer is produced which contains an anhydride moiety. In Step [II], all of the latter moieties are affected by opening the hetero-O-rings in the polymer by means of an appropriate amount of a difunctional amine, i.e., equimolar amounts of a difunctional amine and anhydride moieties in the prepolymer, to provide both carboxyl and tertiary amine functions. In the second embodiment of Step [II], the reaction is carried out between the anhydride moieties and a difunctional amine (containing a tertiary nitrogen atom and either a primary or a secondary nitrogen atom) and 1 mol of said difunctional amine is reacted with 1 mol of the anhydride moiety until the resulting non-gelled polymer has no residual anhydride rings. As in the first embodiment of Step [II], the anhydride ring opening reaction is normally carried out at a temperature between about 120° and 130°C. in about ½ hour to about 2 hours. As before, one can use lower reaction temperatures but they take longer periods of time to complete the reaction and temperatures such as 140°C. and higher can be used but they are not recommended due to the likelihood of gelation of the polymer. The difunctional amine contains two amino groups, one of which is a tertiary amine group and the other is a primary or secondary amine. Illustrative difunctional amines which can be used in the present invention are:

N,N-dimethylamino ethylamine
N,N-dimethylamino propylamine
N,N-diethylamino butylamine
N,N-dipropylamino hexylamine
N,N-dibutylamino octylamine
N-cyclopentyl-N-ethylamino ethylamine
N,N-dimethylamino-N'-methylamino ethane
N,N-diethylamino-N'-ethylamino propane In Step [III], as in the first embodiment, any monoepoxy compound may be used to react completely with the available carboxyl groups to obtain hydroxy functions such as those set forth hereinabove in the discussion of the first embodiment.

In Step [I] above, illustrative acrylates are methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like.

Exemplary of the polymerizable styrenes in Step [I] are styrene, ortho-, meta-, or para-alkyl styrenes, such as the o-, m-, or p-methyl, ethyl, propyl, and butyl styrenes, 2,4-dimethyl styrene, 2,3-dimethyl styrene, 2,5-dimethyl styrene, halo-ring or side-chain styrenes, such as α-chloro styrene, ortho-, meta-, or para-chlorostyrene, 2,4-dichlorostyrene, 2,3-dichlorostyrene, 2,5-dichlorostyrene, or the alkyl side-chain styrenes, such as α-ethyl styrene, and the like.

Free radical initiators required for the polymerization reaction in Step [I] are commercially available. Any may be used in the process of the present invention. Illustrative of such initiators are tertiary butyl hydroperoxide, di-t-butyl peroxide and benzoyl peroxide and the like. Other conditions of reactions, such as temperatures of reactions, are known. For instance, polymerization occurs at temperatures ranging from about 125° and 200°C. Resultant cationic polymeric material is found to be substantially free from unreacted monomer as determined by vapor phase chromatographic tests.

For good adhesion, corrosion and humidity resistance, as well as smoothness and blister-free appearance, it is advantageous to utilize cationic polymers containing from about 1.0 gram to about 25 grams per 1,000 grams 100% solids, and preferably from 5 grams to 20 grams per 1,000 grams 100% solids of the basic tertiary amino nitrogen function, and from 5 grams to 30 grams per 1,000 grams 100% solids, and preferably from 15 grams to 25 grams per 1,000 grams 100% solids of the hydroxyl function.

It may be desirable to use appropriate surfactants to disperse the aforementioned polymeric materials. The term "water-dispersible," therefore, is intended to encompass both aqueous solutions as well as dispersions in which the polymeric material is suspended in the aqueous medium.

All of the cationic, water-dispersible, non-gelled polymeric materials having basic tertiary nitrogen groups and alcoholic hydroxyl groups have reactive sites which are capable of interaction with the second component of the system, namely, a substantially fully etherified, substantially fully methylolated aminotriazine cross-linking agent. Before cross-linking takes place, these aminotriazine compounds also function as plasticizers for the total composition.

These substantially fully etherified, substantially fully methylolated aminotriazine cross-linking agents, such as hexakismethoxymethylmelamine may be prepared according to the process shown in U.S. Letters Patent No. 2,998,441. This patent is incorporated herein by reference. Further, any modification of the hexakismethoxymethylmelamine as shown in U.S. Letters Patent No. 3,471,388, wherein a mixture of substantially water-insoluble, substantially fully etherified hexamethylolmelamines which have no more than four methoxy methyl groups on the average and at least two alkoxy methyl groups selected from the group consisting of ethoxy methyl, propoxy methyl, and butoxy methyl is also contemplated. These mixed, fully etherified hexamethylolmelamine compounds are disclosed in said patent and are incorporated herein by reference. Moreover, any fully etherified tetramethylolbenzoguanamine compound may also be used, such as that disclosed in U.S. Letters Patent No. 3,091,612 and in earlier U.S. Letters Patent Nos. 2,197,357 and 2,454,495, all of which are incorporated herein by reference. Usually, the latter amine aldehyde cross-linking agents are present in amounts ranging from about 4.0% to about 50%, and the balance being principally the polymer containing at least tertiary amine and hydroxyl functions.

The cationic polymer and the etherified amino cross-linking agent are admixed with agitation. Usually, a neutralizing agent having a pK value between 0.1 and 5, such as an inorganic or organic acid, such as hydrochloric acid, nitric acid, sulfuric acid, acetic acid, p-toluenesulfonic acid, malonic acid, or succinic acid, is added to effect solubilization of the polymer in amounts ranging from 1% to 10%, by weight, based on the weight of the polymer.

It has been found that a satisfactory electrocoating bath can be prepared from the aforementioned mixture by blending the same with deionized water to effect its emulsification. It is good practice then to age the emulsified blend for a period of 24 hours. The solids content of the bath is maintained at from about 1% to 20%, and preferably from about 5% to 15%, based on the overall weight of the emulsion.

Electrodeposition is effected at room temperature in the conventional manner by utilizing a metallic substrate to be coated as the cathode and any metallic surface as the anode by applying a potential of from 25 volts to 500 volts, and preferably from 50 volts to 250 volts, across the electrodes. Generally, one to two minutes are sufficient to accomplish the electrocoating process.

The coated substrate is next water-washed, usually with deionized water, and heat-cured to effect cross-linking of the polymer of the present invention. This can be accomplished at temperatures ranging from about 175° to 200°C., or even higher. Further, the coated cured surface is substantially impervious to organic solvents.

It is also within the purview of the present invention to incorporate various dyes and pigment additives to impart color to the polymeric compositions prepared by the process disclosed. For instance, compatible dyes or pigments, such as $TiO_2$, $Fe_2O_3$, metal chromates, such as lead chromate or strontium chromate, or carbon black can be used, such that the resultant coated metal substrate is white, red, yellow, black, or any desired color. Usually, the amounts of pigment incorporated therein range from about 0.1% to about 6% of the overall bath.

The following examples are set forth primarily for purposes of illustration, and any specific enumeration of detail contained therein should not be interpreted as a limitation except as indicated in the appended claims. All parts and percentages are by weight unless otherwise indicated.

EXAMPLE 1

A monomer blend of n-butyl acrylate (325 parts), styrene (125 parts), maleic anhydride (65 parts), and di-t-butyl peroxide, the initiator (15 parts), is fed into p-cymene (50 parts) at 165°C. over a period of 3-½ hours with constant stirring and with an inert nitrogen blanket. After addition of the monomer feed, the reaction is held at 165°C. for 1 hour. The reaction temperature is then lowered to 125°C. and N,N-dimethylamino propanol (68 parts) is added in small portions. After complete addition, the reaction is held at 128°C. for ½ hour. There are next added 200 parts of n-butanol. Thereafter, 50 parts of 1,2-butylene oxide and 1 part of triethylamine are charged. The reaction mixture is kept at 65°–70°C. for 2 hours and then cooled to room temperature to recover the desired resin solution.

It is found that the resin has the following characteristics:

| Basic Nitrogen Content | 57 milligrams KOH per gram 100% solids (i.e., 14.2 grams N per 1000 grams 100% solids) |
|---|---|
| Hydroxyl Content | 57 milligrams KOH per gram 100% solids (i.e., 17.5 grams OH per 1000 grams 100% solids) |

Similar polymers are obtained when either N,N-diethylamino ethanol, 1-imidazolyl butanol, or N,N-diethylamino butanol are substituted for N,N-dimethylamino propanol above.

EXAMPLE 2

One hundred parts of the polymer solution of Example 1 are blended with 25 parts of a tetra(methoxy methyl) benzoguanamine cross-linking agent. To this blend are added 2.8 grams of acetic acid. The resulting mixture is dispersed in 850 parts of deionized water in an electrodeposition tank. Copper parts to be electrocoated are used as the cathode in the electrodeposition tank. A thin film is deposited for one minute at 50 volts. After a baking cycle of 20 minutes at 200°C., a good adhering coating is obtained.

EXAMPLE 3

Example 2 above is repeated in every detail except that the copper substrates have been replaced with bronze parts. Similar good results as in Example 2 are noted.

EXAMPLE 4

A monomer blend of n-butyl acrylate (325 parts), styrene (125 parts), maleic anhydride (65 parts) and di-t-butyl peroxide, the initiator (15 parts), is fed into p-cymene (50 parts) at 165°C. over a period of 3-½ hours with constant stirring under an inert blanket of nitrogen. After complete addition of the monomer feed, the reaction is held at 165°C. for 1 hour. The reaction temperature is then lowered to 125°C. and N,N-dimethylamino propylamine (68 parts) is added in small portions over a period of one-half hour. After complete addition, the reaction is held at 128°C. for one-half hour. There is next added with agitation 200 parts of n-butanol and 50 parts of 1,2-butylene oxide. The reaction mixture is maintained at 65°–70°C. for 2 hours and then it is cooled to room temperature. Vapor phase chromatography indicates the absence of unreacted monomer.

EXAMPLE 5

One hundred parts of the polymer solution obtained in Example 4 are blended with 25 parts of a tetra(methoxy methyl)benzoguanamine cross-linking agent. To this blend are added 2.8 grams of acetic acid. The resulting mixture is dispersed in 850 parts of deionized water. Copper parts to be electrocoated are used as the cathode in the electrodeposition tank. A thin film is deposited for 1 minute at 50 volts. Ater a baking cycle of 20 minutes at 200°C., a good adhering coating is obtained.

EXAMPLE 6

Example 5 above is repeated in every detail except that the copper substrates have been replaced with bronze parts. Similar good results as in Example 5 are noted.

Each of the two embodiments of the present invention as discussed in considerable detail hereinabove may optionally be separately modified by substituting a part of the amino alcohol content and/or a part of the difunctional amine content with a quantity of a monohydric alcohol containing from 1 to 12 carbon atoms or a diol containing 1 primary hydroxy group and 1 secondary hydroxy group or a diol containing 2 primary hydroxy groups of which 1 hydroxy group is sterically hindered containing from 6 to 15 carbon atoms. Since the amino alcohol and/or the difunctional amine when used without this modifier is used in a quantity of a total of about 1 mol of said amino alcohol and/or said difunctional amine per mol of maleic anhydride moiety in said polymer, said principal reactants can be replaced by as much as 0.2 mol to about 0.9 mol of said monohydric and/or dihydric alcohol wherein there still will be used correspondingly from about 0.8 mol to about 0.1 mol of the amino alcohol per mol of anhydride in the terpolymer and also with respect to the difunctional amine there will be used with the monohydric and/or dihydric alcohol correspondingly from about 0.8 mol to about 0.1 mol per mol of the maleic anhydride moiety in said polymer. Since these two components are used in each instance in combination with one another, the total amount of the two components will amount to abou 1.0 mol of the total combination about mol of the maleic anhydride moiety in said polymer.

Illustrative alcohols used in this modification of the two basic embodiments which will be present in amounts ranging between 0.2 mol and 0.9 mol per mol of the maleic anhydride moiety in the prepolymer are: methanol, ethanol, propanol, butanol, pentanol, hexanol, heptanol, octanol, nonyl alcohol, and lauryl alcohol, as well as diols which contain from 3 to 8 carbon atoms and possess nonequivalent hydroxyl groups. In general, the diols, which may be cyclic or acyclic, fall into two principle classes. In one class, they contain a primary and secondary hydroxyl group, such as 1,2-propylene glycol, 1,2-butanediol, 1,3-butanediol, 2,2,4-trimethyl-1,3-pentanediol, or 1-hydroxymethyl-3-(α-hydroxyethyl) cyclohexane. In a second class, the diols contain a primary hydroxyl group and a primary sterically hindered hydroxyl group, such as 2,2-dimethyl-1,4-butanediol; 2,2-dimethyl-1,5-pentanediol; 2,2-diethyl-1,4-butanediol; 2,2-diethyl-1,5-pentanediol; 2,2-dimethyl-1,6-hexanediol; 2,2-dimethyl-1,7-heptanediol; 2,2-dipropyl, 1,5-pentanediol; 2,2-dipropyl-1,4-butanediol; 2,2-dibutyl-1,5-pentanediol, and the like. In our parent case having the Ser. No. 203,888 filed Dec. 1, 1971, it is indicated that one can use from about 0.1 mol to 0.8 mol of the difunctional amine compound with a corresponding 0.9 mol to 0.2 mol of any one of the above listed monohydric or dihydric alcohols wherein the total mol ratio of the amine and the alcohol used equals 1 mol and 1 mol of the combination is used per mol of the maleic anhydride moiety in the terpolymer. In our earlier application having the Ser. No. 203,890 also filed on Dec. 1, 1971, it is indicated that one can use between about 0.1 mol to about 0.8 mol of the amino alcohol compound with a corresponding 0.9 mol to 0.2 mol of any of the above listed alcohols totaling a mol per mol of the maleic anhydride moiety in the terpolymer.

EXAMPLE 7

A monomer blend of n-butyl acrylate (325 parts), styrene (125 parts), maleic anhydride (65 parts) and di-t-butyl peroxide initiator (15 parts) is fed into p-cymene (50 parts) at 165°C. over a period of 3-½ hours with constant stirring and with an inert blanket of nitrogen. After complete addition of the monomer feed, the reaction is held at 165°C. for 1 hour. The reaction temperature is then lowered to 125°C. and N,N-dimethylamino propanol (34 parts) is added in small portions. The reaction is held at 128°C. for one-half hour. Thereafter, 1,2-propylene glycol (35 parts) is added to the resultant reaction mixture which is held at 130°C. for an additional 2 hours. To the latter is added n-butanol (200 parts) into which is incorporated 1,2-butylene oxide (45 parts) at 65°C. The reaction is held for 2 hours at about 65°C. and then cooled to room temperature.

A dark brown colored polymer is obtained having the following characteristics:

| | |
|---|---|
| Basic Nitrogen Content | 29 milligrams KOH per gram 100% solids (i.e., 7.0 grams N per 1,000 grams of 100% solids) |
| Hydroxyl Content | 83 milligrams KOH per gram 100% solids (i.e., 25.4 grams OH per 1,000 grams of 100% solids) |
| Carboxyl Content | 4.0 milligrams KOH per gram 100% solids (i.e., 2.7 grams COOH per 1,000 grams of 100% solids) |

Similar polymers are obtained when either N,N-diethylamino ethanol or N,N-diethylamino butanol are substituted for N,N-dimethylamino propanol above.

EXAMPLE 8

The process of Example 7 is repeated in every detail except that after the addition of n-butanol (200 parts), 37 parts of 1,2-propylene oxide are charged in the place of the 1,2-butylene oxide. The reaction mixture is kept at 65°–70°C. for 2 hours and then cooled to room temperature.

The resulting polymer solution has a solids content of 74% and the polymer therein is characterized as in Example 7 with respect to basic nitrogen content, hydroxyl content, and carboxyl content.

EXAMPLE 9

One hundred parts of the polymer solution obtained in Example 8 are blended with 25 parts of a tetra(methoxy methyl)benzoguanamine cross-linking agent. To this blend are added 2.8 grams of acetic acid. The resulting mixture is dispersed in 850 parts of deionized water in an electrodeposition tank. Copper parts are used as the cathode in the electrodeposition tank. At a voltage of 50 volts, a thin film is deposited for 1 minute. After a baking cycle of 20 minutes at 200°C., a good adhering coating is obtained.

EXAMPLE 10

Example 9 above is repeated in every detail except that the copper substrates have been replaced with bronze parts. Similar good results as in Example 9 are noted.

EXAMPLE 11

A monomer blend of n-butyl acrylate (325 parts), styrene (125 parts), maleic anhydride (65 parts) and di-t-butyl peroxide initiator (15 parts) is fed into p-cymene (50 parts) at 165°C. over a period of 3-½ hours with constant stirring under an inert blanket of nitrogen. After complete addition of the monomer feed, the reaction is held at 165°C. for 1 hour. The reaction temperature is then lowered to 125°C. and N,N-dimethylamino propylamine (34 parts) is added in small portions over a period of ½ hour. After complete addition, the reaction is held at 128°C. for ½ hour. Thereafter, 35 parts of 1,2-propylene glycol are added to the resultant reaction mixture which is held at 130°C. for an additional 2 hours. To the latter is added n-butanol (200 parts) to which is added 1,2-butylene oxide (45 parts) at 65°C. The reaction is held for 2 hours and cooled to room temperature. Vapor phase chromatography indicates the absence of unreacted monomer.

A dark brown polymer having the following characteristics is obtained:

| | |
|---|---|
| Basic Nitrogen Content | 29 milligrams KOH per gram 100% solids (i.e., 7.0 grams N per 1,000 grams of 100% solids) |
| Hydroxyl Content | 83 milligrams KOH per gram 100% solids (i.e., 25 grams OH per 1,000 grams of 100% solids) |
| Carboxyl Content | 4.0 milligrams KOH per gram 100% solids (i.e., 2.7 grams COOH per 1,000 grams of 100% solids) |

Similar polymers are obtained when substituting either N,N-diethylamino ethylamine or N,N-diethylamino butylamine for dimethylamino propylamine.

EXAMPLE 12

The process of Example 11 is repeated in every detail except that subsequent to the addition of n-butanol (200 parts), 37 parts of 1,2-propylene oxide are charged in the place of the 1,2-butylene oxide. The reaction mixture is kept at 65°–70°C. for 2 hours and then cooled to room temperature.

The resin therein is characterized as follows:

| | |
|---|---|
| Basic Nitrogen Content | 29 milligrams KOH per gram 100% solids (i.e., 7.0 grams N per 1,000 grams 100% solids) |
| Hydroxyl Content | 83 milligrams KOH per gram 100% solids (i.e., 24 grams OH per 1,000 grams 100% solids |
| Carboxyl Content | 4.0 milligrams KOH per gram 100% solids (i.e., 2.7 grams COOH per 1,000 grams 100% solids) |

EXAMPLE 13

On hundred parts of the polymer solution obtained in Example 12 are blended with 25 parts of a tetra(methoxy methyl)benzoguanamine cross-linking agent. To this blend are added 2.8 grams of acetic acid. The resulting mixture is dispersed in 850 parts of deionized water in an electrodeposition tank. Copper panels are employed as the cathode in the electrodeposition tank. At a voltage of 50 volts, a thin film is deposited for one minute. After a baking cycle of 20 minutes at 200°C., a good adhering coating is obtained.

EXAMPLE 14

Example 13 above is repeated in every detail except that the copper substrates have been replaced with bronze panels. Similar good results as in Example 13 are noted.

In addition to those modifications discussed hereinabove and shown in Example 7–14 inclusive, the amino alcohol compounds as shown in Examples 1–3 inclusive can be used in combination with the difunctional amine compounds as shown in Examples 4–6 inclusive. When these two classes of compounds are used in combination with one another, they can be used in equimolar proportions but since these two classes of compounds can be used separately and independently of one another, the mol ratio range is between 0.0:1.0 and 1:0.0 for each when used separately or in combination, however, the total mols of the combination must be the same as the total mols of maleic anhydride present.

It has been indicated hereinabove that the polymerization reaction leading to the production of the terpolymer may be conducted at a temperature between about 125° and 200°C. The reaction between the terpolymer and the amino alcohol and/or the difunctional amine compound is not critical but can be carried out between about 120° and 130°C. Those skilled in the art will readily recognize that the higher the reaction temperature, the shorter the reaction time and vice versa. The reaction between the amino alcohol modified terpolymer; the difunctional amine modified terpolymer with the monoepoxy compound, again, is not critical and can be carried out between about 25° and 140°C. and preferably at a temperature not in excess of the boiling point of the monoepoxide compound but in any event not greater than about 140°C. As before, the higher the temperature, the shorter the reaction time. To prepare a non-gelled cationic polymer useful for cathodic electrodeposition, most of the carboxylic acid groups remaining in the polymer after the anhydride ring cleavage are removed by reacting said carboxylic acid groups with up to 1 mol of the monoepoxide compound per mol of carboxylic acid groups. The presence of very small amounts of carboxylic said moieties in the final polymer appears to contribute to good cathodic electrodeposition properties such as higher deposition voltage, better throwing power and smoother films, however, the presence of the residual carboxylic groups is not essential. The reaction of the monoepoxy compound with the carboxylic acid groups can be carried out at those temperatures indicated hereinabove in a reasonable period of time. In the examples, the reaction temperature is governed in some measure by the boiling point of the monoepoxide compound. In the case of the 1,2-butyleneoxide reaction with the pendant carboxylic acid groups of the polymer, the reaction temperature was about 65°C. which is approximately the boiling point of the 1,2-butyleneoxide. This would be carried out at atmospheric pressure or even at superatmospheric pressure, but any significant vacuum is to be avoided inasmuch as the epoxide compound might be removed from the reaction vessel before it had an opportunity to enter into the reaction with the carboxylic acid groups.

In the preparation of the terpolymer of the maleic anhydride, the styrene compound and the alkylacrylate, it is desired to make use of an organic solvent in order to control the molecular weight if the terpolymer, as ultimately modified, is to be used in electrodeposition coating applications. The molecular weight of these terpolymers will generally vary between about 10,000 and 100,000 as determined by gel phase chromatography. If the terpolymer and the ultimate modified product is to be used as a molding composition, no organic solvent is necessary and the terpolymer can be polymerized in bulk. In the examples, use is made of p-cymene as the solvent for the polymerization of the monomers, which p-cymene also functions as a chain transfer agent. Other solvents which may be used are cumene, xylene, mineral spirits, Solvesso 150 and the like.

In the Step III wherein the monoepoxide compound is reacted with the carboxylic acid moieties in the modified terpolymer, no inert organic solvent is necessary but it is generally desirable to use one. In the examples, use is made of an inert organic solvent, namely n-butanol which is added to the reaction mass prior to the introduction of the monoepoxide compound in order to reduce the viscosity of the polymeric material which in turn helps in producing a more homogenous reaction product. It is well known that below 125°C. in the absence of a strong acid catalyst, the hydroxy group of n-butanol will not react with the pendant carboxylic acid groups. The n-butanol is not essential and one can use such other solvents as 2-ethoxyethanol, methylethylketone, methylisobutylketone, diacetone alcohol, tertiary butanol and the like in the place of n-butanol. If one desires, the reaction can be performed in the absence of n-butanol or any other solvent except that such a procedure would be undesirable in a manufacturing plant for such a polymer.

The final cationic polymeric product of the present invention is restricted to about 5 grams to about 30 grams per 1,000 grams, 100% solids of the hydroxyl function and from about 1 gram to about 25 grams per 1,000 grams, 100% solids of the tertiary amino nitrogen function so that when the cationic polymer is emulsified in water using an acid solubilizer, there results in a stable emulsion and electro-deposits on the cathode under electropotential. The deposited film does not redissolve. It is smooth and of uniform thickness.

We claim:

1. A process for preparing a modified cationic vinyl polymer comprising copolymerizing, at a temperature between about 125° and 200°C., a blend of monomers comprising maleic anhydride, a polymerizable styrene and an alkyl acrylate, in the presence of a free radical initiator, therafter, reacting the resultant polymer at a temperature not in excess of 140°C. with a total of 1 mol of an amino alcohol and/or a difunctional amine per mol maleic anhydride moiety in said polymer until the resulting modified polymer has substantially no residual anhydride rings; wherein said amino alcohol has the formula:

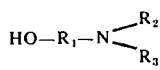

wherein $R_1$ is an alkylene group having $C_2$–$C_{12}$, and $R_2$ and $R_3$ are each an alkyl group having $C_1$ to $C_4$, and wherein said difunctional amine has the formula:

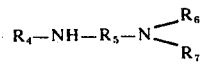

wherein
$R_4$ is hydrogen or an alkyl group having $C_1$–$C_4$;
$R_5$ is an alkylene group having $C_2$ to $C_{12}$; and
$R_6$ and $R_7$ are each alkyl groups having $C_1$ to $C_4$; thereafter reacting the modified polymeric material at a temperature not in excess of 140°C. with a monoepoxy compound having the formula:

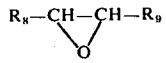

wherein $R_8$ and $R_9$ are each hydrogen or an alkyl group having $C_1$ to $C_{18}$ but when $R_8$ and $R_9$ are each alkyl, they shall contain not more than a total of 18 carbon atoms; wherein the molar ratio of the styrene to maleic anhydride is between about 1:1 and 1:0.05, styrene to maleic anhydride respectively, and the alkyl acrylate is present in an amount between about 40% and 80%, by weight, based on the total weight of all of the polymerizable monomers, wherein said monomers, amino alcohol compound and/or difunctional amino compound and said monoepoxy compound are present in amounts sufficient to supply to the resultant modified polymeric material from about 5 grams to about 30 grams per 1,000 grams 100% solids of the hydroxyl function and from 1 gram to about 25 grams per 1,000 grams 100% solids of the tertiary amino nitrogen function, based on the said modified polymeric material, wherein the thus formed polymeric material is substantially free of unreacted monomers.

2. The process according to claim 1 wherein the polymerizable styrene is styrene per se.

3. The process according to claim 1 wherein the alkyl acrylate is n-butyl acrylate.

4. The process according to claim 1 wherein the amino alcohol is N,N-dimethylamino propanol.

5. The process according to claim 1 wherein the amino alcohol is N,N-diethylamino butanol.

6. The process according to claim 1 wherein the epoxy compound is 1,2-butylene oxide.

7. The process according to claim 1 wherein the epoxy compound is 1,2-propylene oxide.

8. The process according to claim 1 in which the amino alcohol is used in combination with a monohydric alcohol containing from 1 to 12 carbon atoms or a diol containing 1 primary hydroxy group and 1 secondary hydroxy group or a diol containing 2 primary hydroxy groups of which one hydroxy group is sterically hindered containing from 6 to 15 carbon atoms and said alcohol or diol is present in an amount between about 0.2 mol and 0.9 mol and said amino alcohol is present correspondingly in an amount between 0.8 mol and 0.1 mol.

9. The process according to claim 1 in which the difunctional amine is used in combination with a monohydric alcohol containing from 1 to 12 carbon atoms or a diol containing 1 primary hydroxy group and 1 secondary hydroxy group or a diol containing 2 primary hydroxy groups of which one hyroxy group is sterically hindered containing from 6 to 15 carbon atoms and said alcohol or diol is present in an amount between about 0.2 mol and 0.9 mol and said difunctional amine is present correspondingly in an amount between about 0.8 mol and 0.1 mol.

10. The modified cationic vinyl polymer prepared according to claim 1.

* * * * *